United States Patent [19]

Johansson et al.

[11] 4,318,021
[45] Mar. 2, 1982

[54] ROTARY AC MACHINE STATOR WITH PRESSURE HOSE SUPPORTED COIL ENDS

[75] Inventors: Sven Johansson; Roland Kolsmyr; Kristian D. Madsen; Esko Polvi, all of Vesterås, Sweden

[73] Assignee: ASEA Aktiebolag, Vesteras, Sweden

[21] Appl. No.: 99,393

[22] Filed: Dec. 3, 1979

[30] Foreign Application Priority Data

Dec. 8, 1978 [SE] Sweden .............................. 7812632

[51] Int. Cl.³ .............................................. H02K 3/46
[52] U.S. Cl. ..................................................... 310/260
[58] Field of Search ................................. 310/260, 270

[56] References Cited

U.S. PATENT DOCUMENTS

| | | | |
|---|---|---|---|
| 2,602,829 | 7/1952 | Fromm et al. | 310/260 |
| 2,677,067 | 4/1954 | Johnson et al. | 310/260 |
| 2,774,900 | 12/1956 | Acton et al. | 310/260 X |
| 2,885,581 | 5/1959 | Pileggi | 310/260 |
| 2,994,735 | 8/1961 | Marshall et al. | 310/260 X |
| 3,437,859 | 4/1969 | Gibbs et al. | 310/260 |
| 3,949,257 | 4/1976 | Cooper et al. | 310/260 |

FOREIGN PATENT DOCUMENTS 2225203  12/1973  Fed. Rep. of Germany ...... 310/260

Primary Examiner—Mark O. Budd
Attorney, Agent, or Firm—Pollock, Vande Sande & Priddy

[57] ABSTRACT

The invention relates to a stator (1), the coil ends (5+6) of which are supported by means of at least one pressure hose (12, 13, 14) arranged along the circumference of the stator, said pressure hose running zig-zag between radially outer (8) and radially inner (9) surfaces of the coil ends (5+6).

7 Claims, 11 Drawing Figures

4,318,021

ROTARY AC MACHINE STATOR WITH PRESSURE HOSE SUPPORTED COIL ENDS

FIELD OF THE INVENTION

The present invention relates to an AC machine such as motors or generators in which the coil ends of the windings are supported by pressurized hose segments filled, for example, with solified epoxy resin.

A machine of this general type is disclosed in U.S. Pat. No. 3,949,257 issued to Cooper et al.

SUMMARY OF THE INVENTION

In a machine according to the invention, a pressure hose support is obtained which connects the different portions of the coil ends to each other in a simpler and considerably more efficient manner than what is possible with known pressure hose arrangements.

BRIEF DESCRIPTION OF THE DRAWINGS

The invention will be described with reference to the accompanying schematic drawings, in which

FIG. 6 shows a partial, outwardly-directed radial view of the coil ends of the stator, and FIG. 7 shows a partial axial section of the same. FIG. 8 shows a radial section through a radially inner part of a winding support with an associated plastic-filled pressure hose.

DETAILED DESCRIPTION OF THE PREFERRED EMBODIMENTS

Figure 1:
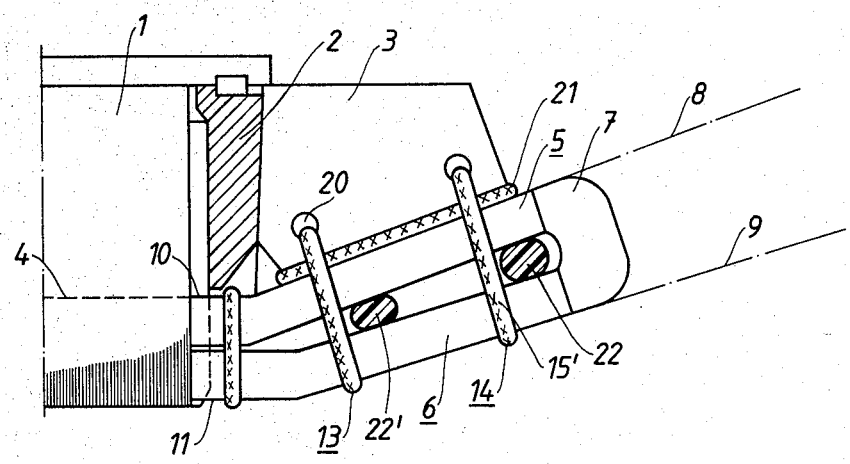
FIG. 1 shows a partial axial section of the stator of an AC machine according to the invention and FIG. 2 shows a radial view of the coil ends of part of the circumference of the stator.
Figure 4:
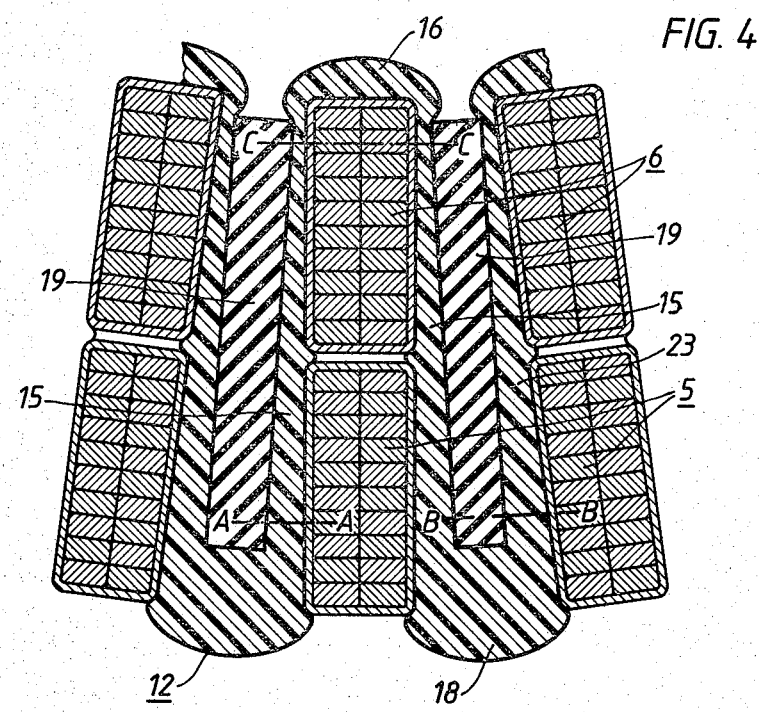
FIG. 4 shows a section of another detail along IV—IV of FIG. 2.
Figure 5:
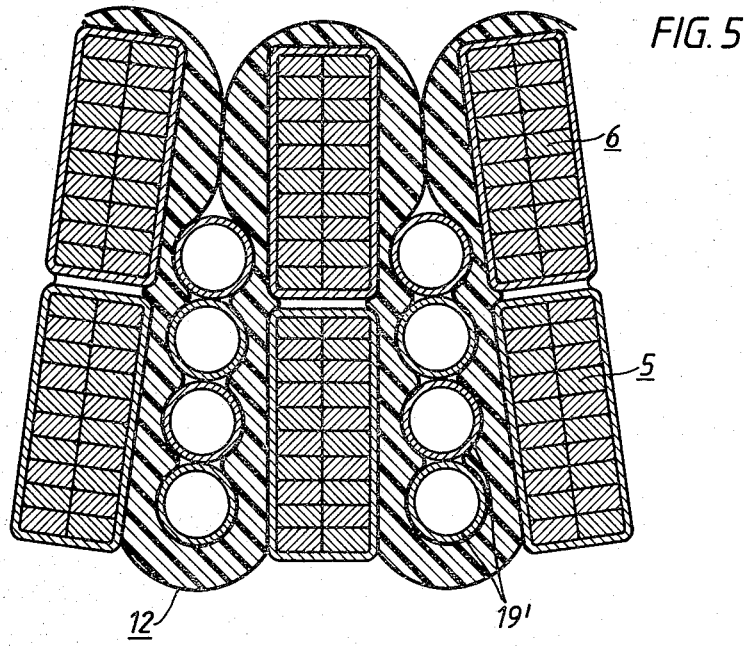
FIG. 5 shows an embodiment which deviates somewhat from that shown in FIG. 4.

In the drawings, 1 designates a laminated stator core of an AC machine. The stator core has a press ring 2 at either end, at least six evenly distributed supporting plates 3 of insulating material being attached to said press ring 2. Also provided in the stator core are winding slots 4, in which a stator winding comprising a plurality of series-connected coils is arranged. Each coil comprises a straight bottom portion lying with its entire length at the bottom of a winding slot, as well as an equally long straight top portion lying at the top of another slot, said straight portions being connected to each other at a stator end by means of a coil end comprising a bottom coil end half 5, a top coil end half 6 and a connecting member 7. The coil ends form a basket-like body which is defined between and touched by two imaginary, concentric rotational surfaces, each consisting of conical surfaces 8 and 9, respectively, and of cylindrical surfaces 10 and 11, respectively. The cylindrical surfaces correspond to straight, axially running coil portions, which are located immediately outside the stator core 1. The coil ends are provided with three zigzag-shaped pressure hoses 12, 13 and 14, each of which runs around the whole stator. The pressure hoses are filled in a known manner, for example in the manner described in the Cooper et al patent, with epoxy resin which has solidified under a pressure of about 5 bar. The pressure hose 12 acts as support for the above-mentioned straight coil end portions, which have surface portions coinciding with the imaginary cylinder surfaces 10 and 11, as suggested in FIG. 1. The pressure hose 12 may be conceived as comprising a plurality of mutually equal zig-zag portions immediately following one after the other in the direction of the hose, as shown in FIG. 4 where such a zig-zag portion is positioned between the dash-dotted lines A—A and B—B. The zigzag-shaped pressure hose 12 contains a plurality of substantially straight hose portions 15, for example that positioned between the dash-dotted lines A—A and B—B, which are substantially perpendicular to the cylindrical portions 10 and 11 of the above-mentioned rotational surfaces and substantially evenly distributed in a tangential direction in the intermediate space. In addition, the hose 12 contains a plurality of 180° bends 16, which are directed with their concave side radially outwardly, as well as a plurality of 180° bends 18, which are each directed with their concave side radially inwardly towards the longitudinal axis of the stator 1. Each of the 180° bends 16 makes contact with three of the sides of a top coil end half 6 and together with two radial portions 15 also surrounds a predominant portion of a bottom coil end half 5 emanating from the same winding slot. Each of the 180° bends 18, in conjunction with two radial hose portions 15, surrounds a predominant portion of a parallelepipedic spacer 19 of a stiff, electrically insulating material, for example glass-fibre-reinforced epoxy resin. As shown in FIG. 5, to achieve better cooling it is possible to use, instead of the spacer shown in FIG. 4, a spacer made of a plurality of axially directed glass fibre tubes 19′, the tube length of which is approximately equal to the axial dimension of the pressure hose.

Figure 9:
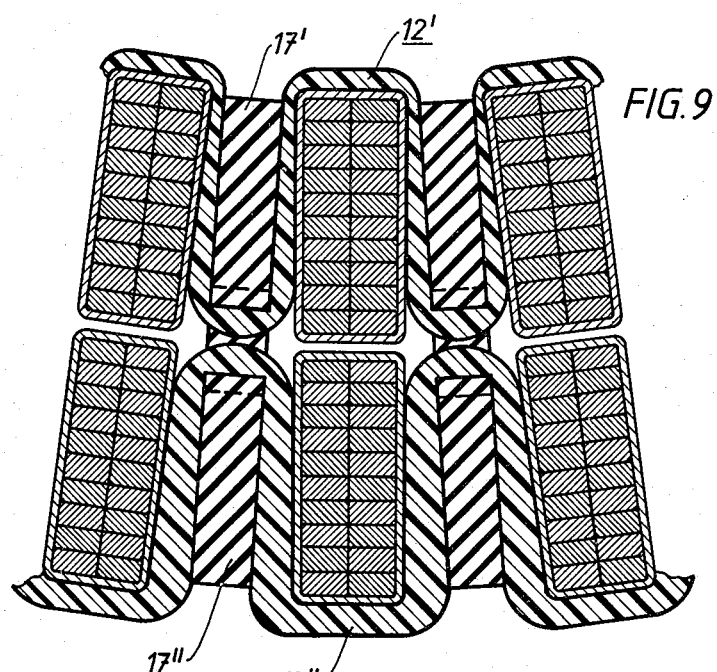
FIG. 9 shows a radial section of an addtional alternative to the staying arrangement shown in FIG. 4.
Figures 10, 11:
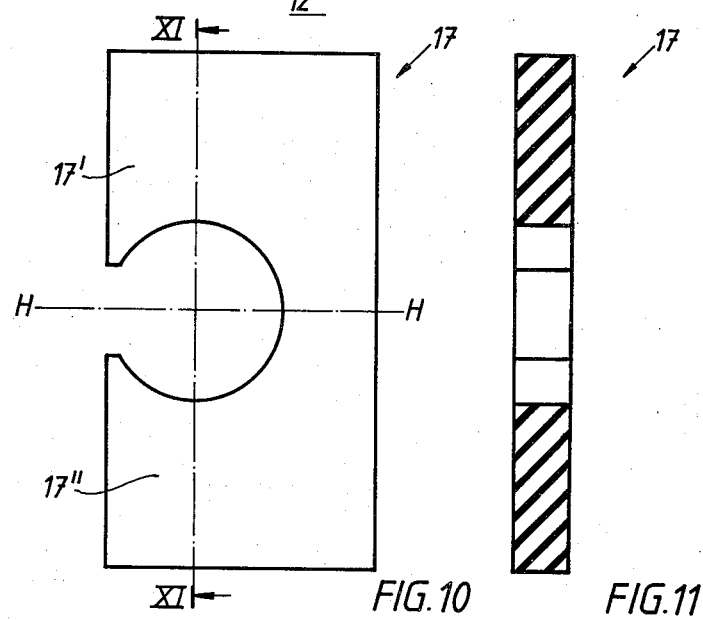
FIG. 10 shows a tangential view of a supporting block which is included in the arrangement shown in FIG. 9.
FIG. 11 shows a section along XI—XI of FIG. 10.

Instead of the arrangements shown in FIGS. 4 and 5, the arrangement shown in FIG. 9 may be used, in which there are used two zigzag-shaped pressure hoses 12′ and 12″, one of which is positioned radially outside the other. The pressure hose 12′ differs from the pressure 12 described above in that its radially directed portions are so short that two such portions together with an intermediate portion, formed as a 180° bend, only surround one single coil end. In addition to the pressure hose 12′ there is used a pressure hose 12″, each zig-zag portion of the pressure hose 12′ then being substantially inversely-symmetrical to a corresponding zig-zag portion of the pressure hose 12″. Each of the pressure hoses 12′ and 12″ has a plurality of spacers 17′ and 17″, respectively, each of which in the individual pressure hoses corresponds to the spacers 19 shown in FIG. 4. Each spacer 17′ is mechanically connected to a spacer 17″ positioned in the same radial plane, for example in that both members are integrated parts of a stay block 17 made in one single piece, as shown in FIGS. 10 and 11 in which the half located above the dash-dotted line H—H may be considered to constitute the spacer 17' and the second half may be considered to constitute the spacer 17".

The pressure hoses 13 and 14 are arranged in the coil end region in which top coil end halves and bottom coil end halves cross each other, that is in a coil end space which is defined between the conical surfaces 8 and 9. Each pressure hose contains a plurality of zigzag portions arranged immediately one after the other in the direction of the hose. Each of the pressure hoses 13 and 14 contains a plurality of straight portions 15' located in the space between the conical surfaces 8 and 9 directed substantially perpendicular to these surfaces, the straight portions 15' being substantially evenly distributed in a tangential direction. Each zigzag portion of the pressure hose 14 comprises a first substantially radially disposed portion 15' which is connected, via a 180° bend 18' facing radially inwardly with its concave side and a further radially disposed portion 15', to a 180° bend 16' which is oriented radially outwardly with its concave side. An imaginary division into 180° bends and radial portions may, for example, be done as shown by lines D—D, E—E and F—F.

Figure 2:
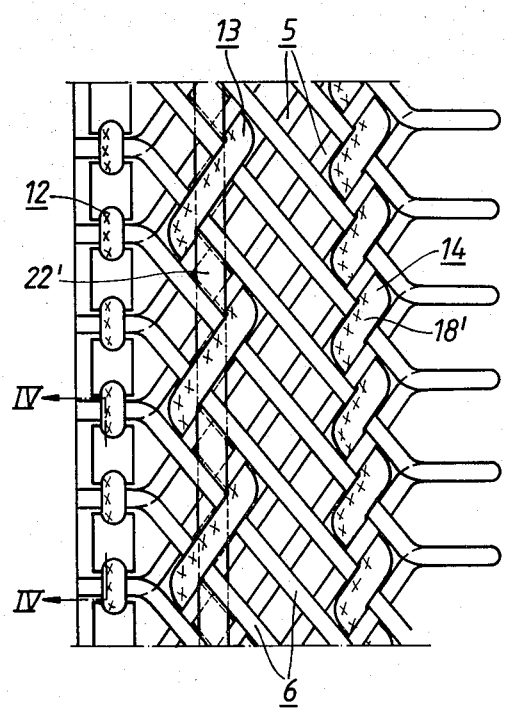
Figure 3:
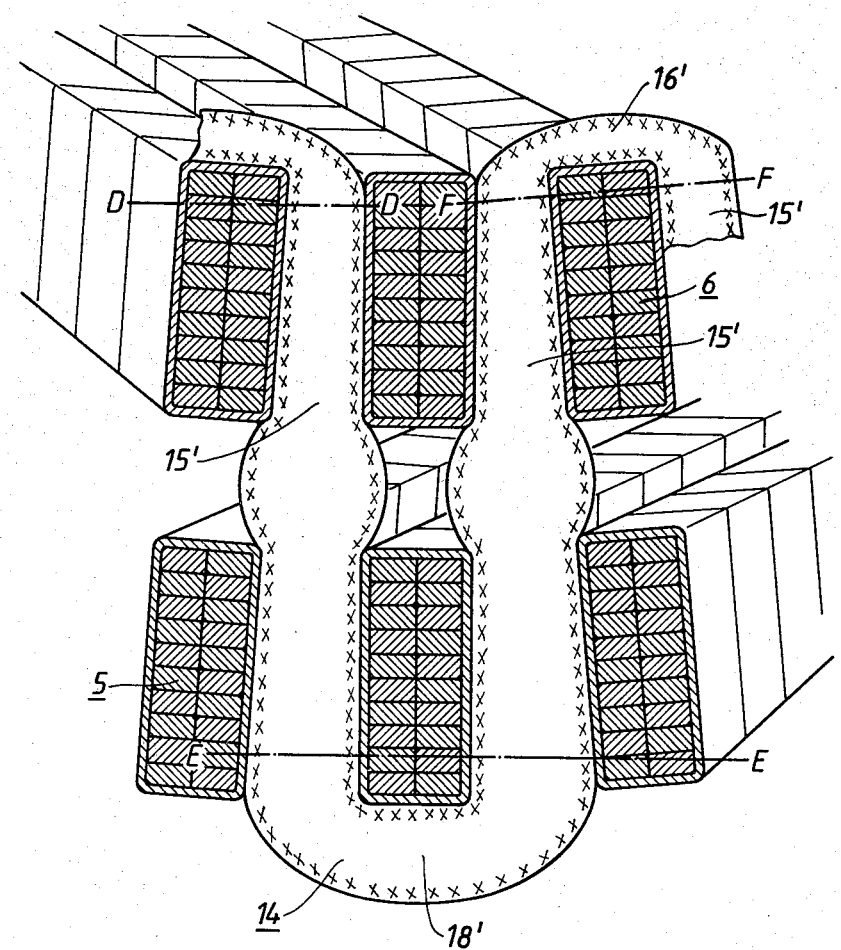
FIG. 3 shows a perspective sketch of a detail of FIG. 2.

Contrary to the pressure hose 12, both the 180° bends of the hose 14 abut a coil end half with their concave sides. The pressure hose 13 differs from the pressure hose 14 in that each of the two U-formed portions in one zig-zag portion abuts two coil end halves with its concave side. See FIG. 2. According to the invention, similar pressure hoses can be made with more than two coil end halves abutting the concave side of each U-formed hose portion.

Between each supporting plate 3 and the coil ends there is a corresponding coil support spacer 21 of insulating material, and radially inside this spacer there is a winding layer spacer in the form of two turns 22' and 22 of a pressure hose filled with cured resin. The turns may be separate, circular turns or be part of a helical pressure hose which is arranged radially inside the coil end halves 5 and radially outside the coil end halves 6, for example in such a way that at least one turn is surrounded by several zigzag portions belonging to a hose 13 or 14, that is, in such a way that at least one of the hoses 13 and 14 is twined around the winding layer spacer. See FIG. 2.

Figure 6:
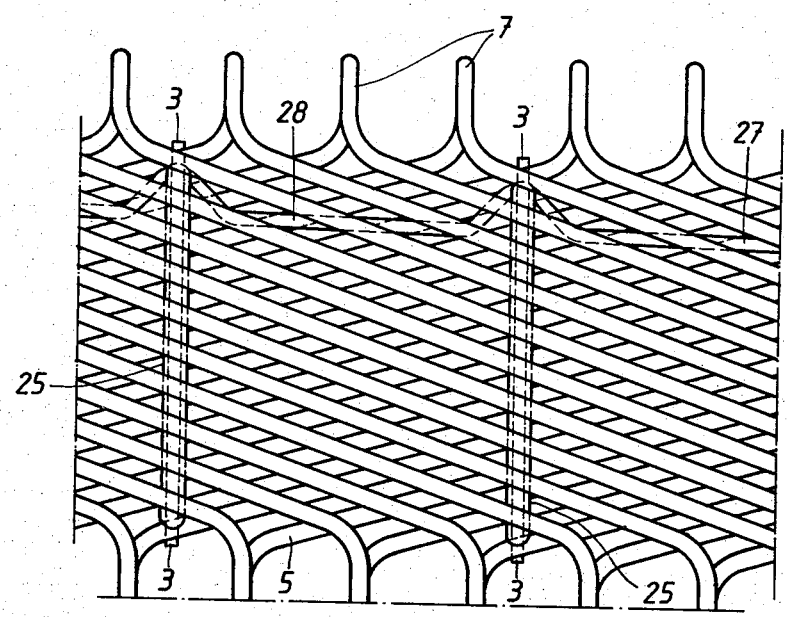
FIGS. 6, 7 and 8 show an embodiment of the invention which deviates from that described in connection with FIGS. 1 and 2 only with regard to the design of the spacers of the coil supports and the winding layers. The other components included in the supporting system are not shown in FIGS. 6, 7 and 8.
Figure 7:
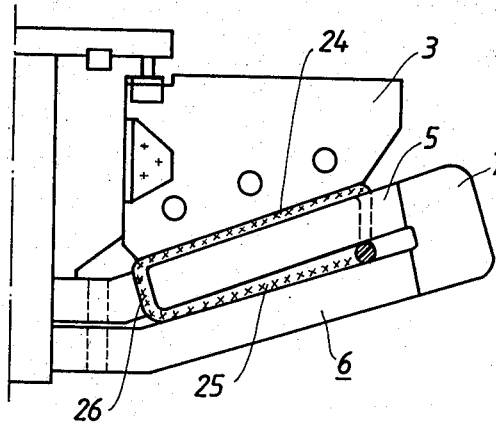
Figure 8:
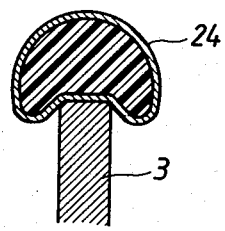

Alternatively, instead of the pressure hose turns 22 and 22' and the coil support spacer 21, one single intermediate pressure hose may be used, as shown in FIGS. 6, 7, 8. This pressure hose is arranged with a plurality of substantially axially running portions 24 making contact individually with an inwardly-facing surface of a corresponding coil support 3, each hose portion 24 constituting a coil support spacer. The pressure hose filled with solidified epoxy resin has a width which is at least 40% greater than the tangential dimension of the contact surface of the coil support 3 facing the pressure hose, which means that the pressure hose portion 24 is secured in the tangential direction, which is indicated in FIG. 8. As its axially innermost end the pressure hose portion 24 changes into a substantially radially running pressure hose portion 26, which is directly connected to a substantially axially disposed pressure hose portion 25 located between the two layers of coil end halves of the coil ends, and which together with the hose portions 24 and 26 form a yoke-formed hose portion in which the legs of the yoke are directed axially outwardly and then change into individual tangentially disposed portions 27 and 28, respectively, each of these portions constituting a support arranged between the two layers of the coil ends.

The invention also comprises the case where only one or a plurality of pressure hoses 13 or 14 are used in the coil end region defined between the conical surfaces 8 and 9, and the case where the pressure hose 12 is used only.

Instead of the supporting plate 3, other supporting membrs can be used in a machine according to the invention, and the mechanical connection between each supporting member and the coil ends need not necessarily be accomplished by means of a pressure hose, which, however, is a very favourable solution. If an annular supporting member is used instead of supporting plates 3, said member is preferably provided with hooks, protrusions or the like, which are each surrounded by a 180° bend of a pressure hose 13 or 14.

In the manufacture of a machine according to the invention, known apparatus may be used, for example that described in the above-mentioned patent specification. Curable resin is pumped into the pressure hoses at a pressure which is preferably in the range of 3-10 bar. In addition to a sufficient compressive strength, it is important that the hose material also has great flexibility, since the hose shall be arranged in a very winding pattern.

It has been found that the above-mentioned combination can best be accomplished by using a plastic hose which is provided with reinforcement mainly in an outer layer. The reinforcing is preferably carried out as a braided stocking, the inner surface of which may be glued or cast to the plastic hose lying inside it, whereas the outwardly-facing surface is for the main part without any coating which may prevent relative motion between the threads of the stocking.

When the hose used for receiving the pressurized, curable resin has not a very high ability to resist pressure, the pressure hose 13 should be preferred to the pressure hose 14, as the former can be filled with resin more easily.

Having described our invention in sufficient detail to enable others to make and use it, we claim:

1. In a stator rotary AC machine of the type including a stator core having two press rings and winding slots in which a stator winding composed of coils is arranged, each coil comprising a straight bottom portion lying at the bottom of a winding slot as well as a straight top portion lying at the top of another slot, said straight portions being connected to each other at a stator end by means of a coil end comprising a bottom coil end half and a top coil end half connected in series with each other by means of a connecting loop, all the coil end halves being positioned between first and second imaginary rotational surfaces, and rotational surfaces coinciding with coil end surfaces along the entire axial coil end extension and being coaxial with the stator core, and at least one flexible pressure hose being pressure filled with curable resin to provide support for the coil ends, the improvement that in the space between said first and second rotational surfaces said flexible pressure hose comprises a plurality of first substantially straight hose portions which extend radially in relation to said stator core and are distributed along the circumference of said stator winding, a plurality of U-shaped second hose portions connected with said plurality of first hose portions and opened radially outwardly, and a plurality of U-shaped third hose portions connected with said plurality of first hose portions and opened radially inwardly, so that said flexible pressure hose forms a zig-zag configuration, a plurality of said second and/or third U-shaped hose portions being each arranged with its concave side in mechanical contact with at least one coil side.

2. A stator according to claim 1, wherein each of said coil end halves each comprises a straight, axially running portion located immediately outside a winding slot, and said flexible pressure hose is arranged to support said axially running portions, each U-shaped hose portion directed in one of said radial directions surrounding partially at least one coil end, and each U-shaped hose portion directed in the opposite radial direction partially surrounding one spacer, said spacer together with two of said first pressure hose portions providing mechanical connection in the tangential direction between two of said straight coil end portions.

3. A stator according to claim 1, wherein said flexible pressure hose is located within a space defined between a conical portion of said first rotational surface and a conical portion of said second rotational surface, each of said second U-shaped hose portions making mechanical contact by its concave side with at least one coil end half which, with part of its surface, is lying in the radially innermost of said rotational surfaces and each of said third U-shaped hose portions making contact by its concave side with at least one coil end half which, with part of its surface, is lying in the radially outermost of said rotational surfaces.

4. A stator according to claim 3, further comprising a layer spacing hose filled with cured resin and arranged tangentially between said bottom coil end halves and said top coil end halves, said flexible pressure hose being twined around said layer spacing hose with a plurality of turns.

5. A stator according to claim 3, wherein some of said third U-shaped hose portions surround a part of a coil supporting member rigidly connected to said stator core.

6. A stator according to claim 3, wherein a plurality of coil supporting members are arranged one after another in the tangential direction, each rigidly connected to said stator core and each provided with a coil support spacer arranged between the coil supporting member and a plurality of bottom coil end halves, said coil support spacers being constituted by corresponding portions of a spacing pressure hose filled with cured resin.

7. A stator according to claim 6, wherein said spacing pressure hose comprises a plurality of substantially axially running hose portions arranged between bottom and top coil end halves, each of said axially running hose portions together with one of said coil support spacers and a radially running hose portion forming a U-shaped hose portion, the legs of which are directed axially outwardly, said legs being connected to a corresponding tangentially running portion of said spacing pressure hose.

* * * * *